(12) United States Patent
Gould et al.

(10) Patent No.: US 7,524,565 B2
(45) Date of Patent: Apr. 28, 2009

(54) RADIATION CURABLE MICHAEL ADDITION RESINS HAVING BUILT-IN PHOTOINITIATORS

(75) Inventors: Michael L. Gould, Powell, OH (US); Terry E. Hammond, Columbus, OH (US); Sridevi Narayan-Sarathy, Dublin, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 127 days.

(21) Appl. No.: 11/109,478

(22) Filed: Apr. 19, 2005

(65) Prior Publication Data

US 2005/0261388 A1   Nov. 24, 2005

Related U.S. Application Data

(60) Provisional application No. 60/564,026, filed on Apr. 21, 2004.

(51) Int. Cl.
| | |
|---|---|
| C07C 69/54 | (2006.01) |
| C07C 69/72 | (2006.01) |
| C07C 49/12 | (2006.01) |
| C08F 2/46 | (2006.01) |
| B32B 17/10 | (2006.01) |
| B32B 27/10 | (2006.01) |

(52) U.S. Cl. ............... 428/441; 428/500; 428/511; 522/14; 522/34; 522/36; 522/182; 522/183; 568/303; 568/335; 560/178; 560/205

(58) Field of Classification Search ........... 522/34, 522/37, 14, 36, 182, 183; 428/441, 500, 428/511; 568/303, 335; 560/178, 205

See application file for complete search history.

(56) References Cited

U.S. PATENT DOCUMENTS

| | | | | |
|---|---|---|---|---|
| 4,876,384 | A  * | 10/1989 | Higbie et al. | 560/224 |
| 4,987,160 | A  * | 1/1991 | Frihart et al. | 522/164 |
| 5,109,053 | A  * | 4/1992 | Smith et al. | 524/514 |
| 5,837,746 | A  * | 11/1998 | Kohler et al. | 522/8 |
| 5,859,084 | A  * | 1/1999 | Schroder et al. | 522/34 |
| 5,945,489 | A  * | 8/1999 | Moy et al. | 525/471 |
| 6,207,727 | B1 * | 3/2001 | Beck et al. | 522/64 |
| 6,706,414 | B1 * | 3/2004 | Dammann et al. | 428/524 |
| 6,803,112 | B1 * | 10/2004 | Chatterjee et al. | 428/458 |
| 7,166,648 | B2 * | 1/2007 | Lachowicz et al. | 522/36 |
| 7,307,106 | B2 * | 12/2007 | Fansler et al. | 522/34 |
| 2005/0080162 | A1 * | 4/2005 | Narayan-Sarathy et al. | 523/160 |

FOREIGN PATENT DOCUMENTS

WO        WO 03/082929        * 10/2003

* cited by examiner

*Primary Examiner*—Susan W Berman (57) ABSTRACT

The liquid, uncrosslinked, UV-curable Michael addition resins and blends of the present invention exhibit performance properties that make them very effective coating materials and these properties can be modified greatly depending upon composition. Michael donors and acceptors can be constructed from Type I and/or Type II photoinitiators and can be included in the coating compositions disclosed to make UV-curable coatings with extraordinary photoreactivity and properties. Resins can be produced that show excellent adhesion to metals, plastics, wood, paper and glass. They exhibit wide ranges of hardness, toughness, flexibility, tensile strength, stain resistance, scratch resistance, impact resistance, solvent resistance, etc. Almost any desired coating performance parameter can be attained by proper selection of raw material building blocks.

13 Claims, 6 Drawing Sheets

Creation of novel "hybrid chromophore" Michael adduct from Type I photoactive moiety containing acetoacetate Michael donor and TMPTA.

Related Art

Figure 1. Novel UV-curable oligomer from the Michael addition reaction of TMPTA and EAA.

Related Art

Figure 2. UV-cure of TMPTA by irradiation of monomer and photoinitiator/synergist.

Figure 3. Building blocks for binding traditional Type I and Type II photoinitiators into self-initiating Michael addition polyacrylate oligomers.

Figure 4. Creation of novel "hybrid chromophore" Michael adduct from Type I photoactive moiety containing acetoacetate Michael donor and TMPTA.

2-Hydroxy-1-[4-(2-hydroxyethoxy)
phenyl]-2-methyl-1 propanone
(Traditional Type I cleavage photoinitiator)

UV-Active "Michael Oligomer"
(Disclosed in U.S. 5,945,489)

"Hybrid" or dual chromophore Michael adduct

Figure 5. Contrasting chromophores that comprise traditional Type I photoinitiator, Michael adduct self-initiating oligomer and hybrid dual chromophore (Type I photoactive moiety plus Michael product substituted ketone). Circled areas indicate the point of homolytic bond cleavage to produce initiating species.

Figure 6. Hybrid or dual chromophore from glycidyl acetoacetate, TMPTA and 4-hydroxybenzophenone. Circled or boxed areas indicate photoactive sites.

US 7,524,565 B2

RADIATION CURABLE MICHAEL ADDITION RESINS HAVING BUILT-IN PHOTOINITIATORS

CROSS REFERENCE TO RELATED APPLICATION

Benefit of priority is claimed under Title 35 U.S.C. §119(e) of U.S. provisional application, Ser. No. 60/564,026; filed Apr. 21, 2004.

This application is a continuation-in-part of the provisional application Ser. No. 60/564,026, filed Apr. 21, 2004.

BACKGROUND OF THE INVENTION

The present invention relates to multifunctional acrylate oligomers (Michael addition resins) formed from the reaction of acrylate monomers and oligomers (Michael acceptors) and β-dicarbonyl compounds (Michael donors) such as β-ketoesters, β-diketones, β-ketoamides and the like that can participate in the Michael addition reaction. In particular the invention relates to improved Michael addition resins with better cure response that have been modified to contain additional photoactive moieties, such as photoinitiators and/or photosensitizers. The improved Michael addition resins have multiple photoactive groups resulting directly from the Michael addition reaction as well as pendant Type I photoactive moieties (e.g., substituted benzoins, benzyl ketals, acetophenones or acyl phosphine oxides) or Type II photoactive moieties (e.g., substituted benzophenones, thioxanthones, camphorquinones, or bisimidazoles).

Multifunctional acrylates and methacrylates are commonly utilized in the preparation of crosslinked films, adhesives, foundry sand binders, composite materials, etc. U.S. Pat. No. 5,945,489 and U.S. Pat. No. 6,025,410 (both Ashland, Inc.) disclose liquid, uncrosslinked resins prepared via the Michael addition reaction of β-dicarbonyl compounds with multifunctional acrylates. The present invention comprises liquid, uncrosslinked, UV-curable Michael addition resins prepared utilizing β-dicarbonyl Michael donors and/or acrylate acceptors that are modified to contain pendant Type I (e.g., substituted benzoins, benzyl ketals, acetophenones or acyl phosphine oxides) or Type II (e.g., substituted benzophenones, thioxanthones, camphorquinones or bisimidazoles) photoactive moieties. The resulting oligomers thus possess either or both Type I and Type II photoactive functional groups that promote the addition polymerization of acrylic groups upon exposure to UV light. This structural change provides a supplementary chromophore for the initiation of free radical polymerization in addition to the photoactive substituted ketone formed during the Michael reaction.

The invention disclosed here demonstrates the advantageous use of these uncrosslinked resins alone or modified by reaction/blending with additional materials in coatings applications on a variety of substrates. These additional materials include a variety of acrylic and vinyl monomers and oligomers, primary and secondary amines, organonitro compounds, acid-functional materials, siloxanes, elastomers, waxes and others to modify and improve coatings performance.

The oligomers described above can be cured by all methods typically used to crosslink acrylic materials, though most advantageously by exposure to UV radiation. Cure, or crosslinking, is usually accomplished through a free radical chain mechanism, which may require any of a number of free radical-generating species such as peroxides, hydroperoxides, REDOX complexes, etc., which decompose to form radicals when heated, or at ambient temperature in the presence of amines and transition metal promoters. Electron beam (EB) radiation is another energy source suitable for initiating reaction of acrylic moieties.

The resins described in this invention offer significant advantages over traditional multifunctional acrylic monomers and oligomers in that they can be cured upon exposure to UV radiation without additional photoinitiator. Traditional multifunctional acrylates and/or oligomers will not cure upon exposure to UV radiation unless a photoinitiator, often at relatively high levels, is added to coating formulations. Traditional photoinitiators (e.g., benzophenone) can be insoluble, toxic, expensive, and contribute to film color, which can limit applicability of the coating over white and light-colored substrates. Furthermore, decomposition of some traditional photoinitiators results in cleavage products (e.g. benzaldehyde) that are of concern from a health perspective. Cleavage fragments may "bloom" to the surface of cured coatings where they can come into contact with skin. The invention disclosed here allows for the expeditious use of these traditional chromophore moieties while anchoring or "tethering" the largest fragments to the thermoset coating matrix.

The novel resins and blends disclosed herein exhibit performance properties that make them very effective coating materials. These properties can be modified greatly depending upon composition. Resins can be produced that show excellent adhesion to metals, plastics, wood, paper and glass. They exhibit wide ranges of hardness, toughness, flexibility, tensile strength, stain resistance, scratch resistance, impact resistance, solvent resistance, etc. Almost any desired coating performance parameter can be attained by proper selection of raw material building blocks.

SUMMARY OF THE INVENTION

The invention detailed herein comprises a family of novel multifunctional acrylate oligomers formed by the reaction of acrylate monomers and oligomers with β-ketoesters (e.g., acetoacetates), β-diketones (e.g., 2,4-pentanedione), β-keto amides (e.g., acetoacetanilide, acetoacetamide), and/or other β-dicarbonyl compounds that can participate in the Michael addition reaction as Michael donors, and the use of these resins in coatings. The Michael addition resins of the invention are modified to contain photoactive moieties that function as photoinitiators. That is, the resulting Michael oligomer has multiple photoactive ketone groups directly resulting from the Michael Addition reaction, as disclosed in U.S. Pat. Nos. 5,945,489 and 6,025,410, as well as pendant Type I photoactive moieties (e.g., substituted benzoins, benzyl ketals, acetophenones or acyl phosphine oxides) or Type II photoactive moieties (e.g., substituted benzophenones, thioxanthones, camphorquinones or bisimidazoles). This allows for a much lower loading of β-dicarbonyl Michael donor, resulting in oligomers with reduced viscosity and better cure response than those previously disclosed.

The novel oligomers described above will cure at low doses of UV radiation under standard UV-cure conditions. Other materials, both reactive (conventional polyacrylates) and non-reactive (e.g., solvents) may also be incorporated into the system to enhance the coatings properties. These additives include a variety of acrylic and vinyl monomers and oligomers, primary and secondary amines, organonitro compounds, acid-functional monomers and oligomers, organic and inorganic fillers, silicones, waxes and elastomers, among others. The resins exhibit excellent performance when used as coatings for a variety of substrates including metal, plastic, wood, paper and glass. These coatings may be cured via chemical means, thermally, or by exposure to UV or electron beam radiation.

BRIEF DESCRIPTION OF THE SEVERAL DRAWINGS

FIG. 2. TMPTA is combined with benzophenone. Methyl diethanolamine is added as a synergist to improve the efficiency of the polymerization. The mixture cures to a very brittle, highly crosslinked film upon exposure to UV radiation.

DETAILED DESCRIPTION OF THE INVENTION

Figure 1:
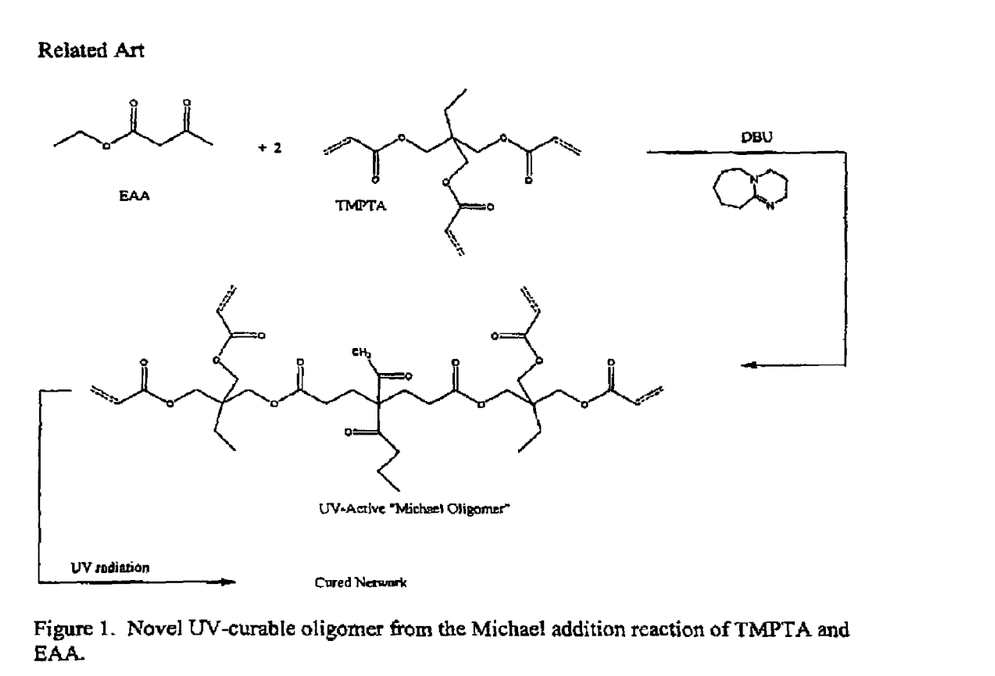
FIG. 1. Trimethylol propane triacrylate (TMPTA) is reacted in a 2:1 molar ratio with ethyl acetoacetate (EAA) in the presence of 1,8-diazabicyclo[5.4.0]undec-7-ene (DBU). The resulting polyacrylate oligomer has dual functionality. It has both acrylic functionality (tetra) and a substituted ketone group that is capable of dissociating to initiate free radical polymerization of the oligomer upon exposure to UV light.
Figure 2:
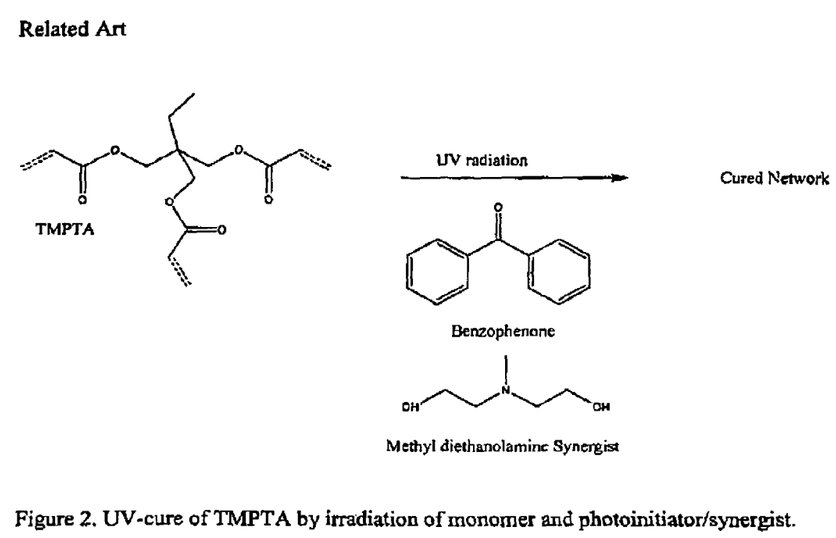
Figure 3:
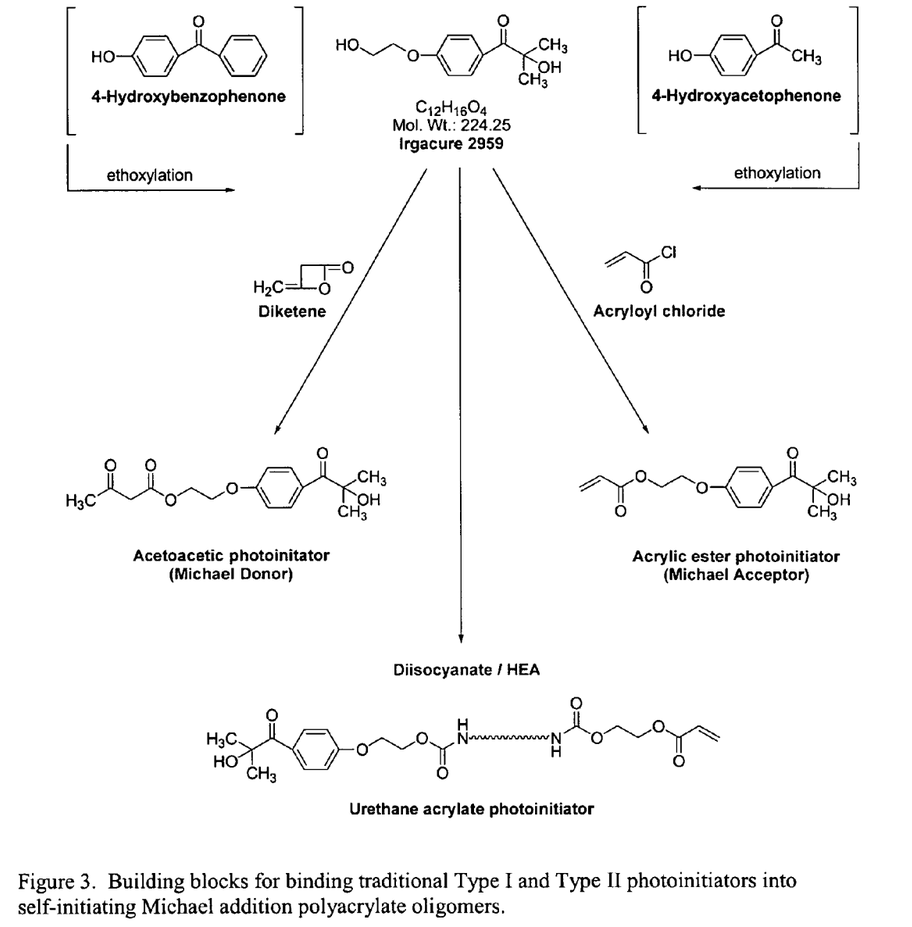
FIG. 3. A traditional benzyl ketal class photoinitiator (4-(2-hydroxyethoxy)phenyl-2-hydroxy-2-propyl ketone) is reacted with functionalizing reagents to yield the product molecules as shown. The product molecules, being acetoacetoxy functional (A), or acrylic functional (B, C) are then utilized in the reaction scheme detailed in FIG. 4.
Figure 4:
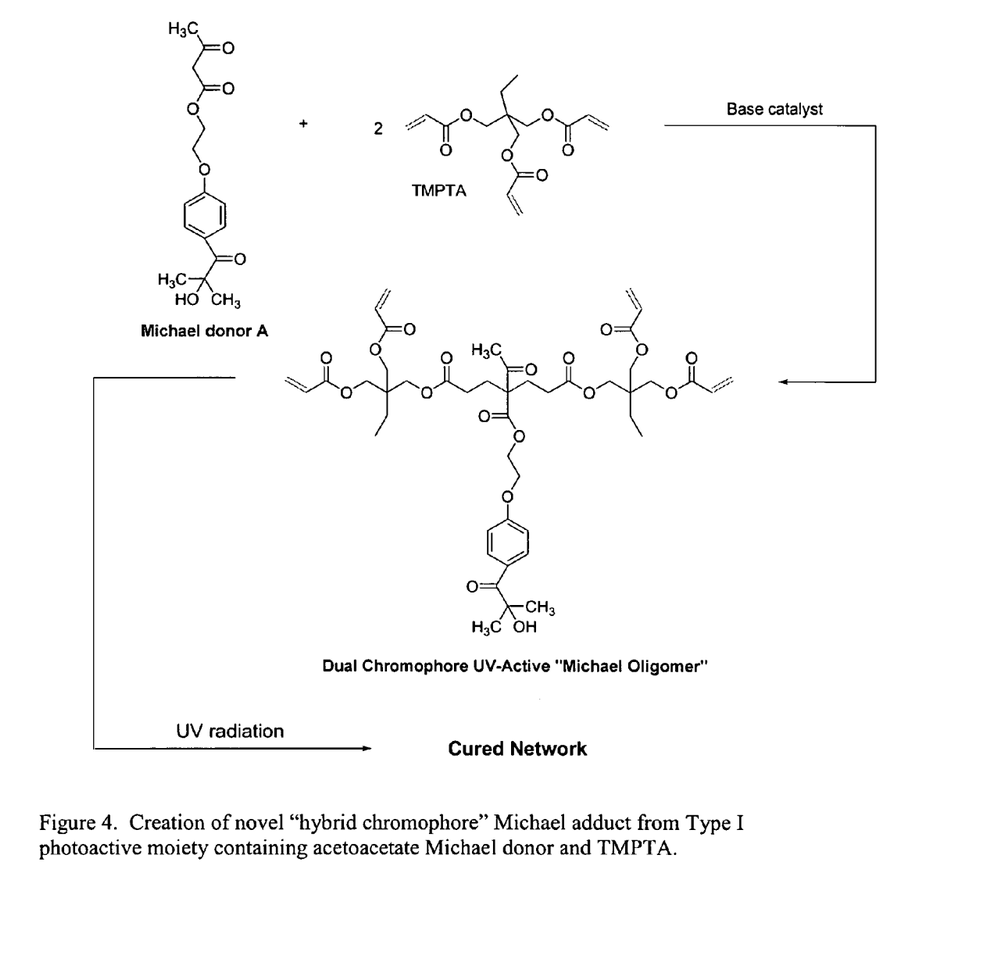
FIG. 4. Creation of a novel "hybrid chromophore" Michael adduct from Type I α-cleavage acetoacetate Michael donor and TMPTA.
Figure 5:
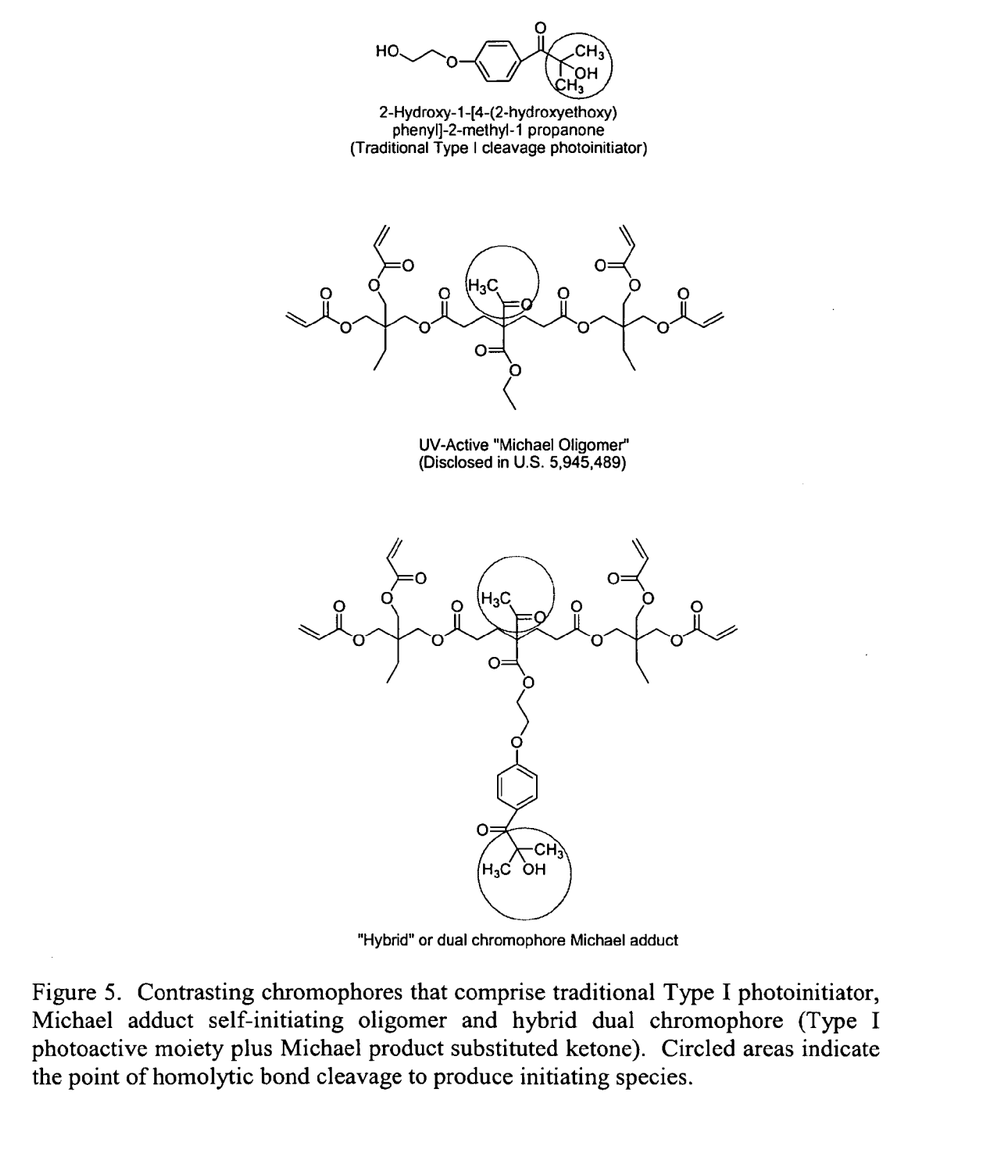
FIG. 5 Illustrates contrasting chromophores that comprise traditional Type I α-cleavage photoinitiator, Michael adduct self-initiating oligomer and hybrid dual chromophore (Type I photoactive moiety plus Michael product substituted ketone). Circled areas indicate the point of homolytic bond cleavage to produce initiating radical species.
Figure 6:
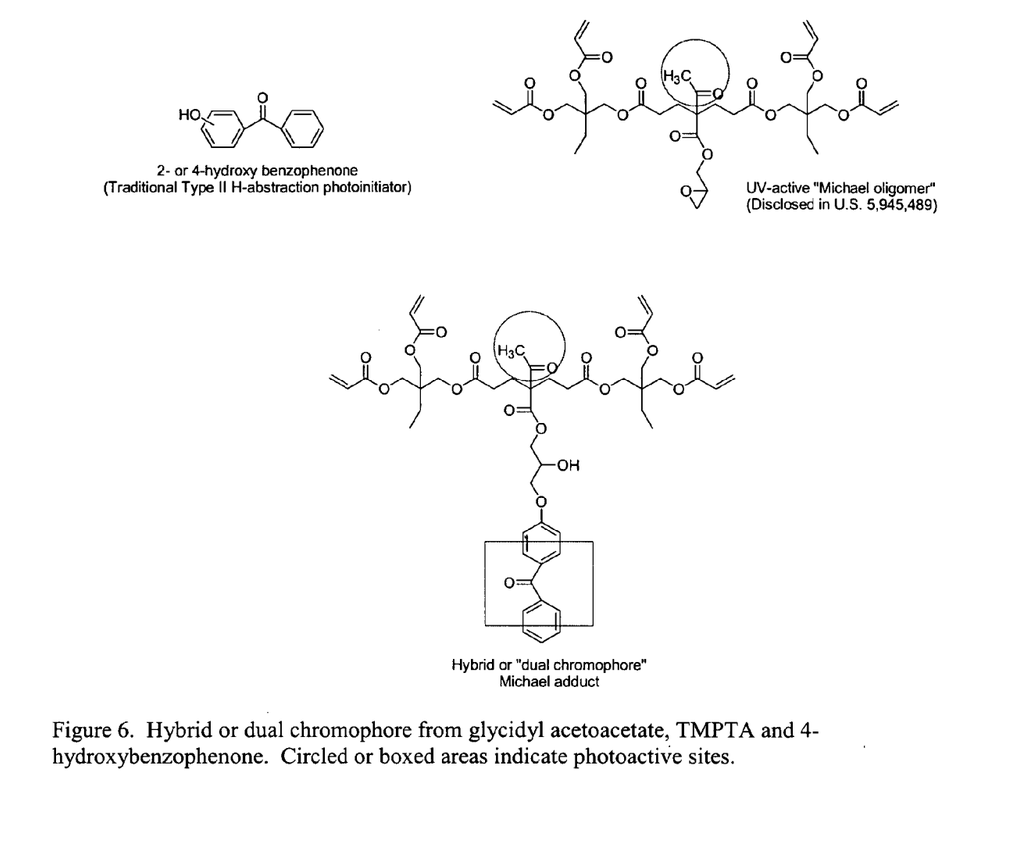
FIG. 6. Creation of novel "hybrid chromophore" Michael adduct from Type II H-abstraction photoinitiator (hydroxy benzophenone), glycidyl acetoacetate Michael donor and TMPTA.

The invention relates to liquid, uncrosslinked, UV-curable Michael addition resins that have been modified to contain Type I and/or Type II photoactive moieties. For purposes of this invention a Michael addition resin is equivalently termed a Michael polyacrylate resin, a Michael oligomer, a Michael adduct, or a Michael addition product. The Michael addition resins of the present invention can be prepared in the presence of catalysts. Other components known in the art can be added to the liquid, uncrosslinked, UV-curable Michael addition resin such as amine synergists, reactive diluents, silicones, waxes, and the like.

The liquid, uncured Michael addition resin is a polyacrylate oligomer formed from a multifunctional acrylate Michael acceptor and a β-dicarbonyl Michael donor. A small amount of mono-functional acrylate can be incorporated along with the multifunctional acrylates to modify the product oligomers, for instance, to enhance adhesion, toughness or other characteristics of the final Michael adduct. This technology is described in U.S. Pat. Nos. 5,945,489 and 6,025,410, both assigned to Ashland Inc., the entire contents of which are incorporated by reference.

The β-dicarbonyl Michael donor is suitably chosen from among β-ketoesters, β-diketones, β-ketoamides, and β-ketoanilides. The multifunctional acrylate Michael acceptor is suitably chosen from among monoacrylates, diacrylates, triacrylates, tetraacrylates and the like. The range of β-dicarbonyl donors and mono- or multifunctional acrylate acceptors affords the composition designer the opportunity to exercise a great range of selectivity in the properties of the final product.

Monoacrylates include, but are not limited to: 2-phenoxyethyl acrylate (PEA) and/or higher order alkoxylated products, isobornyl acrylate, tetrahydrofurfuryl acrylate (THFFA), glycidyl acrylate, dodecyl acrylate, phenylthioethyl acrylate, acrylate-functional polysiloxanes, perfluoroalkyl ethyl acrylate esters and mixtures thereof. When used the monoacrylate is present in amounts up to about 20 wt %, preferably up to about 10 wt %, based on the total weight of the Michael addition resin.

Diacrylates include, but are not limited to: ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, thiodiglycol diacrylate, acrylate-functional polysiloxanes, epoxy diacrylate, aryl urethane diacrylate, aliphatic urethane diacrylate, polyester diacrylate, and mixtures thereof.

Triacrylates include, but are not limited to: trimethylol propane triacrylate, glycerol triacrylate, ethoxylated trimethylolpropane triacrylate, propoxylated trimethylolpropane triacrylate, tris (2-hydroxyethyl) isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof.

Tetraacrylates include, but are not limited to: di-trimethylolpropane tetraacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, polyester tetraacrylates, melamine tetraacrylates, epoxy novolac tetraacrylates, acrylate-functional polysiloxanes and mixtures thereof.

The present invention can be practiced with a β-ketoester (e.g., ethyl acetoacetate), a β-ketoanilide (e.g., acetoacetanilide), a β-ketoamide (e.g., acetoacetamide) or a mixture of Michael donors according to the desired resin quality.

Suitable β-dicarbonyl donor compounds having functionality of 2 include, but are not limited to: ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxylethyl methacrylate, allyl acetoacetate, benzyl acetoacetate, 2,4-pentanedione, isobutyl acetoacetate, and 2-methoxyethyl acetoacetate.

Suitable β-dicarbonyl donor compounds having functionality of 4 include, but are not limited to: 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality of 6 include, but are not limited to: trimethylol propane triacetoacetate, glycerin triacetoacetate, and polycaprolactone triacetoacetates.

The Michael addition reaction is catalyzed by a strong base. An example of such a base is diazabicycloundecene (DBU), which is sufficiently strong and is readily soluble in the monomer mixtures. Other cyclic amidines, for example diazabicyclo-nonene (DBN) and guanidines are also suitable for catalyzing this reaction. Group I alkoxide bases such as potassium tert-butoxide, provided they have sufficient solubility in the reaction medium, and are also typically adequate to promote the desired reaction. Quaternary hydroxides and alkoxides, such as tetrabutyl ammonium hydroxide or benzyltrimethyl ammonium methoxide, comprise another class of base catalysts that promote the Michael addition reaction. Finally, strong, organophilic alkoxide bases can be generated in situ from the reaction between a halide anion (e.g., quaternary halide) and an epoxide moiety. Such in situ catalysts are disclosed in U.S. Pat. No. 6,706,414 assigned to Ashland, Inc. the entire contents of which are specifically incorporated herein by reference.

The Michael addition resins disclosed can also be modified to enhance performance by adding an amine synergist. An example of such a modification includes incorporating primary or secondary amines into the uncured Michael addition resin. This technique is disclosed in U.S. Pat. No. 6,673,851 the entire teaching of which is incorporated herein by reference. Typical primary amines include ethanolamine, methyl-1,6-hexanediamine, 3-aminopropyltrimethoxysilane, diaminopropane, benzyl amine, triethylenetetraamine, isophorone diamine and mixtures thereof. Typical secondary amines include dimethylamine, dibutyl amine, diethanolamine (DEA), piperidine, morpholine and mixtures thereof. If the liquid Michael addition resin is modified with a primary or secondary amine, the modifying amine is simply reacted with the liquid, uncured, Michael addition resin.

In the present invention the β-dicarbonyl Michael donor and/or Michael acceptors are modified to contain pendant Type I (e.g., substituted benzoins, benzyl ketals, acetophenones or acyl phosphine oxides) or Type II (e.g., substituted benzophenones, thioxanthones, camphorquinones or bisimidazoles) photoactive moieties. The resulting liquid, uncrosslinked Michael addition resins possess either or both Type I and Type II photoactive functional groups that promote the addition polymerization of acrylic groups upon exposure to UV light in addition to a substituted ketone resulting from the Michael addition reaction. Examples of modified Michael donors include Michael donors containing a Type I photoactive moiety having the mixed structures

Michael donors containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group. Michael donors containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group. Michael donors containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group, and R is a simple alkyl or aryl group. Michael donors containing a Type II photoactive moiety having the structure, including isomers where W, X, Y and/or Z are, independent, of each other, a halogen, hydrogen, alkyl, alkoxy, aryl, amino, alkylamino, nitrile, nitro, sulpho-, or phospho-group. Michael donors containing a Type II photoactive moiety having the structure, including formula isomers where W, X, Y and/or Z are, independent of each other, a halogen, hydrogen, alkyl, alkoxy, aryl, amino, alkylamino, nitrile, nitro, sulpho-, or phospho-group and the like.

The resin products described in the following examples can be diluted with common solvents for spray application to substrates, or applied at 100% solids by means consistent with article shape and constitution. Application of the resins to substrates in these examples was accomplished by the "draw down" technique to produce films of varying thickness, unless otherwise noted. Cure was effected by exposure to a single 600 W Fusion "H" bulb at the specified dose. Chemical resistance assessments were done on phosphate-treated steel panels.

Resin performance properties were measured by a variety of test methods. For purposes of defining properties by means familiar to others skilled in the art, the following test methods were utilized:

Dynamic Viscosity—value in Poise at the defined temperature based on constant shear cone and plate measurement Cure Response—value assignment of 1 (wet; uncured), 2 (sticky), 3 ("greasy surface", easily marred), 4 (tack-free, can be marred with cotton swab), or 5 (tack-free/mar-free) based on assessment of coating following exposure to a "benchmark" dose of 500 mJ/cm$^2$ total radiation.

Minimum Dose to Tack-Free/Mar-Free Cure—total dose in mJ/cm$^2$ to achieve a "5" rating on the above scale.

MEK resistance—# of MEK double rubs required to break through or significantly mar the coating The following examples illustrate the constitution, application, cure and performance properties of the novel multifunctional acrylate oligomers detailed in this disclosure.

Material Preparation 1: Irgacure 2959 Acetoacetate

Irgacure 2959 Type I photoinitiator Irgacure 2959 from Ciba-Geigy, 224.25 g, was added to 250 ml toluene in a 2-liter, 3-neck round bottom flask equipped with overhead stirrer, thermocouple, condenser and nitrogen inlet. 158.2 g tert-butyl acetoacetate from Eastman Chemical Company was added and the reactor was stirred at room temperature until homogeneous. The reactor contents were then heated to 110° C. and the reactor was held at that temperature for 30 minutes.

After 1 hour of total heating time, the reactor was fitted with a distillation head and the toluene/t-butanol azeotrope was stripped off under moderate nitrogen flow until the pot temperature reached 125° C. At such time, the reactor contents were decanted into a 1-liter single neck round bottom flask and the yellow liquid was stripped on a rotary evaporator for 2 hours at 70° C. with a slight nitrogen sparge. 309 g of viscous yellow liquid were recovered. Analysis by NMR suggested near quantitative conversion of the Irgacure 2959 as a mixture of primary or tertiary esters. For easier handling, the resin was diluted with trimethylol propane (ethoxy) triacrylate (TMPEOTA) to 52% w/w active acetoacetate.

Material Preparation 2: Glycidyl Acetoacetate

Glycidyl acetoacetate was prepared according to the method of Witzeman and Nottingham (J. Org. Chem, 1991, 56, 1713). Glycidol (Dixie Chemical Company, Pasadena, Tex.), 296 g, t-butyl acetoacetate, 632.8 g, and toluene, 500 ml, were mixed in a 1-liter reactor equipped with mechanical stirrer, thermocouple, condenser and nitrogen inlet. The reactor contents were heated to 110° C. and held at that temperature for 30 minutes. The reactor was then fitted with a distillation head and the toluene/t-butanol azeotrope was distilled from the reactor over 2 hours under moderate nitrogen flow. Peak temperature reached in the reactor was 120° C. After 4 hours total time, the reaction mixture was cooled and stripped on a rotary evaporator at 70° C. for 2 hours. The yellow liquid product was analyzed by proton NMR. Essentially quantitative conversion of glycidol to glycidyl acetoacetate was confirmed.

Material Preparation 3: 2959 Acrylate Ester

Irgacure 2959 Type I photoinitiator, 132 g, was added to ethyl acetate in a 2-liter, 3-neck round bottom flask equipped with overhead stirrer, thermocouple, condenser and addition funnel with a nitrogen inlet. Cold acryloyl chloride (Aldrich Chemical Company, Milwaukee, Wis.), 57.9 g, was added and the reactor was cooled to <5° C. with an ice bath. Triethylamine, 65 g, was added dropwise over 90 minutes, keeping reactor temperature below 10° C. The yellow "slurry" was stirred for 2 hours at room temperature and a sample analyzed by FTIR. Very little hydroxyl functionality was observed and the reaction was judged to be complete. The product was suction filtered at room temperature and the filter cake rinsed with ethyl acetate twice. The product liquor was then poured into a 500 ml single neck flask and stripped on a rotary evaporator with light sparge of dry air at 40° C. for 2 hours. 163 g of viscous yellow liquid were recovered. Analyses by NMR and FTIR suggested near quantitative conversion (>97%) of the Irgacure 2959. For easier handling, the resin was diluted with hexanediol diacrylate (HDDA) to 75% w/w active 2959 acrylate ester.

Material Preparation 4: 2959/HEA MDI Diacrylate

Methylene diphenyl diisocyanate (Mondur ML, Bayer), 528 g, and hexanediol diacrylate (HDDA), 605 g, were stirred in a 2-liter resin kettle equipped with overhead stirrer, thermocouple, condenser and air inlet. Dibutyltin dilaurate (DABCO T-12, Air Products), 0.81 g, and Irgacure 2959, 448.5 g, were added to the stirring mixture and the reactor was heated to 60° C. 2-HEA, 232.4 g, was then added slowly over 30 minutes, keeping peak temperature below 65° C. Subsequent reaction was monitored by FTIR. The constituents were heated for a total of 25 hours at which time, the reaction was deemed complete by both NMR and FTIR. An additional 605 g of HDDA were added, creating a 50% w/w concentration of 2959 urethane acrylate in monomer.

EXAMPLE 1

"Benchmark Example": No Built-In Type I or Type II Photoinitiator

Hexanediol diacrylate, 126.6 g, trimethylol propane triacrylate (TMPTA), 9.8 g, XZ 92551.00 epoxy acrylate (The Dow Chemical Company, Midland, Mich.), 29.6 g, ethyl acetoacetate (EAA), 21.4 g, tetrabutylammonium bromide, 0.96 g and glycidyl methacrylate, 3.8 g were combined according to the method described in U.S. Pat. No. 6,706,414. The reactor temperature was set to 95° C. and held at that temperature until 100% disubstitution of the Michael donor was achieved, as defined by $^{13}$C NMR. After 4 hours, diethanol amine, 7.9 g, was added to the mixture and the reaction product was cooled to room temperature with stirring.

The final product was a low viscosity clear liquid having a cone and plate viscosity of 231 cP. The resin product was applied to a phosphate-treated steel panel and irradiated with UV light from a 600 W/in medium pressure mercury lamp (Fusion "H" bulb).

The following properties were tabulated for the resin prepared above:

| Performance Property | Value |
| --- | --- |
| Viscosity (Poise, 25° C.) | 2.31 |
| Cure Response (500 mJ/cm$^2$) | 3 |
| Minimum Dose to Tack-Free/Mar-Free Cure | 1740 mJ/cm$^2$ |
| MEK Resistance | >200 |

EXAMPLE 2

Hexanediol diacrylate, 113.8 g, trimethylol propane triacrylate, 8.8 g, XZ 92551.00 epoxy acrylate, 26.6 g, ethyl acetoacetate, 16.1 g, Irgacure 2959-based acetoacetate, 22.8 g of 50% w/w solution from material preparation 1, tetrabutylammonium bromide, 0.96 g and glycidyl methacrylate, 3.9 g were combined according to the method described in U.S. Pat. No. 6,706,414. The reactor temperature was set to 95° C. and held at that temperature until 100% disubstitution of the Michael donor was achieved, as defined by $^{13}$C NMR. After 4 hours, diethanol amine, 7.1 g, was added to the mixture and the reaction product cooled to room temperature with stirring.

The final product was a low viscosity, clear liquid having a cone and plate viscosity of 320 cP. The resin was applied to a phosphate-treated steel panel and irradiated with UV light from a 600 W/in medium pressure mercury lamp (Fusion "H" bulb).

The following properties were tabulated for the resin prepared above:

| Performance Property | Value |
| --- | --- |
| Viscosity (Poise, 25° C.) | 3.20 |
| Cure Response (500 mJ/cm$^2$) | 5 |
| Minimum Dose to Tack-Free/Mar-Free Cure | 446 mJ/cm$^2$ |
| MEK Resistance | >200 |

EXAMPLE 3

Hexanediol diacrylate, 129.3 g, trimethylol propane triacrylate, 10.0 g, XZ 92551.00 epoxy acrylate, 30.2 g, glycidyl acetoacetate (GAA), 17.7 g and tetrabutylammonium bromide, 0.96 g, were combined according to the method described in U.S. Pat. No. 6,706,414. The reactor temperature was set to 95° C. and held at that temperature until 100% disubstitution of the Michael donor was achieved, as defined by refractive index measurement. 2-(4-chlorobenzoyl) benzoic acid (CBBA), 14.6 g, was added and held at temperature for approximately two hours. At such time, all of the CBBA had been consumed by reaction with epoxy moieties. After 6 hours total cook time, diethanol amine, 8.0 g, was added and the reaction mixture cooled to room temperature with stirring.

The final product was a low viscosity clear liquid having a cone and plate viscosity of 366 cP. The resin product was applied to a steel panel and irradiated with UV light from a 600 W/in medium pressure mercury lamp (Fusion "H" bulb).

The following properties were tabulated for the resin prepared above:

| Performance Property | Value |
| --- | --- |
| Viscosity (Poise, 25° C.) | 3.66 |
| Cure Response (500 mJ/cm$^2$) | 5 |
| Minimum Dose to Tack-Free/Mar-Free Cure | 185 mJ/cm$^2$ |
| MEK Resistance | >200 |

EXAMPLE 4

Hexanediol diacrylate, 114.8 g, Actilane 584 (Akzo Nobel Resins), 31.7 g, XZ 92551.00 epoxy acrylate, 28.5 g, glycidyl acetoacetate (GAA), 12.5 g and tetrabutylammonium bromide, 0.96 g, were combined according to the method described in U.S. Pat. No. 6,706,414. The reactor temperature was set to 95° C. and held at that temperature until 100% disubstitution of the Michael donor was achieved, as defined by a refractive index measurement. 2-benzoylbenzoic acid (BBA), 10.3 g, was added and held at temperature for approximately two hours. At such time, all of the BBA had been consumed by reaction with epoxy moieties. After 7 hours total cook time, diethanol amine, 7.6 g, was added to the mixture and the reaction product was cooled to room temperature with stirring.

The final product was a low viscosity clear liquid having a cone and plate viscosity of 230 cP. The resin product was applied to a steel panel and irradiated with UV light from a 600 W/in medium pressure mercury lamp (Fusion "H" bulb).

The following properties were tabulated for the resin prepared above:

| Performance Property | Value |
| --- | --- |
| Viscosity (Poise, 25° C.) | 2.30 |
| Cure Response (500 mJ/cm$^2$) | 5 |
| Minimum Dose to Tack-Free/Mar-Free Cure | 243 mJ/cm$^2$ |
| MEK Resistance | >200 |

EXAMPLE 5

Hexanediol diacrylate, 192.3 g, trimethylol propane triacrylate, 44.4 g, ethyl acetoacetate, 35.8 g, Irgacure 2959-based acrylate ester, 9.3 g of 75% w/w solution in HDDA from material preparation 3, tetrabutylammonium bromide, 1.45 g and glycidyl methacrylate, 5.8 g were combined according to the method described in U.S. Pat. No. 6,706,414. The reactor temperature was set to 95° C. and held at that temperature until 100% disubstitution of the Michael donor was achieved, as defined by $^{13}$C NMR. After 3 hours total reaction time, diethanol amine, 6.0 g, was added to the mixture and the reaction product cooled to room temperature with stirring.

The final product was a low viscosity clear liquid having a cone and plate viscosity of 111 cP. The resin product was applied to a steel panel and irradiated with UV light from a 600 W/in medium pressure mercury lamp (Fusion "H" bulb).

The following properties were tabulated for the resin prepared above:

| Performance Property | Value |
| --- | --- |
| Viscosity (Poise, 25° C.) | 1.11 |
| Cure Response (500 mJ/cm²) | 4 |
| Minimum Dose to Tack-Free/Mar-Free Cure | 650 mJ/cm² |
| MEK Resistance | >200 |

EXAMPLE 6

Hexanediol diacrylate, 192.3 g, trimethylol propane triacrylate, 44.4 g, ethyl acetoacetate, 35.8 g, Irgacure 2959-based urethane acrylate, 19.7 g of 75% w/w solution in HDDA, similar to that from material preparation 4, tetrabutylammonium bromide, 1.46 g and glycidyl methacrylate, 5.8 g were combined according to the method described in U.S. Pat. No. 6,706,414. The reactor temperature was set to 95° C. and held at that temperature until 100% disubstitution of the Michael donor was achieved, as defined by refractive index. After 4.5 hours total reaction time, diethanol amine, 12.0 g, was added to the mixture and the reaction product cooled to room temperature with stirring.

The final product was a low viscosity clear liquid having a cone and plate viscosity of 301 cP. The resin product was applied to a steel panel and irradiated with UV light from a 600 W/in medium pressure mercury lamp (Fusion "H" bulb).

The following properties were tabulated for the resin prepared above:

| Performance Property | Value |
| --- | --- |
| Viscosity (Poise, 25° C.) | 3.01 |
| Cure Response (500 mJ/cm²) | 5 |
| Minimum Dose to Tack-Free/Mar-Free Cure | 449 mJ/cm² |
| MEK Resistance | >200 |

EXAMPLE 7

Hexanediol diacrylate, 203.6 g, XZ 92551.00 epoxy acrylate, 45.0 g, 2,4-pentanedione, 25.0 g, Ebecryl P-36 acrylic benzophenone ester, 14.5 g, tetrabutylammonium bromide, 1.48 g and glycidyl methacrylate, 5.9 g were combined according to the method described in U.S. Pat. No. 6,706,414. The reactor temperature was set to 95° C. and held at that temperature until 100% disubstitution of the Michael donor was achieved, as defined by refractive index. After 5.5 hours total reaction time, diethanol amine, 4.0 g, was added to the mixture and the reaction product cooled to room temperature with stirring.

The final product was a low viscosity clear liquid having a cone and plate viscosity of 180 cP. The resin product was applied to a steel panel and irradiated with UV light from a 600 W/in medium pressure mercury lamp (Fusion "H" bulb).

The following properties were tabulated for the resin prepared above:

| Performance Property | Value |
| --- | --- |
| Viscosity (Poise, 25° C.) | 1.80 |
| Cure Response (500 mJ/cm²) | 5 |

-continued

| Performance Property | Value |
| --- | --- |
| Minimum Dose to Tack-Free/Mar-Free Cure | 425 mJ/cm² |
| MEK Resistance | >200 |

The novel resins and blends disclosed here exhibit performance properties that make them very effective coating materials and these properties can be modified greatly depending upon composition. Resins can be produced that show excellent adhesion to metals, plastics, wood, paper and glass. They exhibit wide ranges of hardness, toughness, flexibility, tensile strength, stain resistance, scratch resistance, impact resistance, solvent resistance, etc. Almost any desired coating performance parameter can be attained by proper selection of raw material building blocks.

We claim:

1. A liquid, uncrosslinked, UV-curable Michael addition product, comprising a reaction product of multifunctional acrylate Michael acceptor and a Type I and/or Typo II photoinitiator-modified β-dicarbonyl Michael donor selected from the group consisting of a. a Michael donor containing a Type I photoactive moiety having the mixed structures b. a Michael donor containing a Type II photoactive moiety having the structure, including isomers where W, X, Y and/or Z are, independent of each other, a halogen, hydrogen, alkyl alkoxy, aryl, amino, alkylamino, nitrile, nitro, sulpho-, or phospho-group;

c. a Michael donor containing a Type II photoactive moiety having the structure, including isomers where W, X, Y and/or Z are, independent of each other, a halogen hydrogen, alkyl, alkoxy, aryl, amino, alkylamino, nitrile, nitro, sulpho-, or phospho-group;

d. a Michael donor containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group, and R is a simple alkyl or aryl group;

e. a Michael donor containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group; and f. a modified Michael donor containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group.

2. The Michael addition product of claim 1 wherein the Michael acceptor is a photo-initiator modified Michael acceptor.

3. The Michael addition product of claim 1, wherein the Michael acceptor is a mixture of a multifunctional acrylate and a multifunctional acrylate.

4. The Michael addition product of claim 1, wherein the Michael acceptor is a diacrylate, a triacrylate, a tetreacrylate or mixtures thereof.

5. A composition comprising the Michael addition product of claim 1 and an amine synergist 6. A composition comprising the Michael addition product of claim 1 and a catalyst.

7. A composition comprising the Michael addition product of claim 1 and a reactive diluent.

8. The coating comprising the cured, crosslinked residue of the Michael addition product of claim 1.

9. The coating of claim 8, wherein the Michael addition product is cured by exposure to actinic radiation.

10. An article, comprising;
A. a substrate, and
B. a cured, crosslinked residue of the Michael addition product of claim 1.

11. The article of claim 10, wherein the substrate is metal, plastic, wood, paper or glass.

12. The Michael addition product of claim 1, having an excess of Michael acceptor equivalents relative to Michael donor equivalents.

13. A modified β-dicarbonyl Michael donor containing a Type I and/or Type II photoactive moiety selected from the group consisting of a. a Michael donor containing a Type I photoactive moiety having the mixed structures b. a Michael donor containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group;

c. a Michael donor containing a Type II photoactive moiety having the structure, including isomers where W, X, Y and/or Z are, independent of each other, a halogen hydrogen, alkyl, alkoxy, aryl, amino, alkylamino, nitrite, nitro, sulpho-, or phospho-group;

d. a Michael donor containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group, and R is a simple alkyl or and group;

e. a Michael donor containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group; and f. a modified Michael donor containing a Type II photoactive moiety having the structure, including isomers where W, X, Y and/or Z are, independent of each other, a halogen, hydrogen, alkyl, alkoxy, aryl, amino, alkylamino, nitrile, nitro, sulpho-, or phospho-group.

\* \* \* \* \*